March 25, 1924.

D. DOYLE

BELT PULLER

Filed Sept. 12, 1921

1,487,924

Patented Mar. 25, 1924.

1,487,924

UNITED STATES PATENT OFFICE.

DANIEL DOYLE, OF VERONA, CALIFORNIA.

BELT PULLER.

Application filed September 12, 1921. Serial No. 500,144.

*To all whom it may concern:*

Be it known that I, DANIEL DOYLE, a citizen of the United States, residing at Verona, in the county of Sutter and State of California, have invented new and useful Improvements in Belt Pullers, of which the following is a specification.

This invention relates to chain or belt pullers and has for an object the provision of a tool by means of which the ends of chains may be brought into proper position for coupling.

Another object of the invention is the provision of a tool of this character which is simple in construction and use and which may be easily connected to the chain so that a maximum pull may be exerted and the ends of the chain brought into proper aligned position for the insertion of the usual coupling link.

With the above and other objects in view, the invention further includes the following novel features and details of construction, to be hereinafter more fully described, illustrated in the accompanying drawings and pointed out in the appended claim.

In the drawings:—

Figure 1:
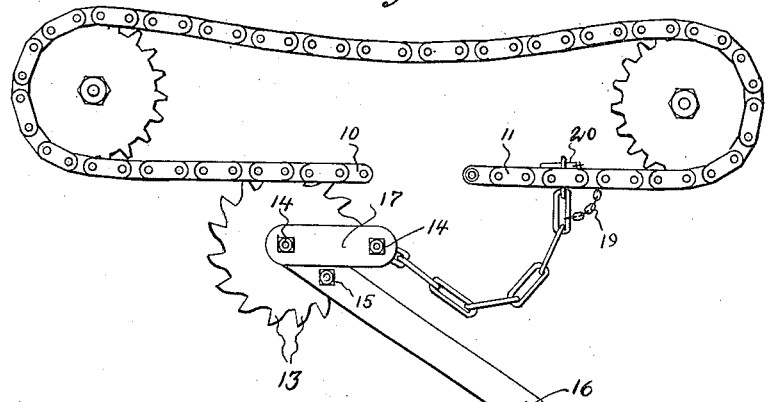
Figure 1 is a side elevation of a portion of a chain showing the use of the invention, the parts being in the position prior to the pull.

Referring in detail to the drawings, wherein like characters of reference denote corresponding parts, the reference characters 10 and 11 indicate the adjacent ends of a chain intended to be coupled together. This may represent a chain belt, or a chain of any character.

The invention which comprises a tool to be used for bringing the adjacent ends of the chain into proper position for coupling, includes a head 12 which is herein shown as of circular formation, which is provided with teeth 13. These teeth are adapted to engage within the links of the chain and to operate within said links after the manner of a sprocket wheel, so that the chain will be moved with respect to the head. Secured to the head as indicated at 14 and 15, is a handle 16, which is bifurcated to receive the head 12, the fastening devices 14 and 15 passing through this bifurcated end and through the head.

Pivotally secured concentrically to the head is a yoke 17, the point of connection of the yoke and head being effected by means of the fastening devices 14. Secured to the yoke 17 is one end of a chain or other flexible element 18, the opposite end of this chain having connected thereto a short length of chain 19, which carries a pin 20.

Figure 2:
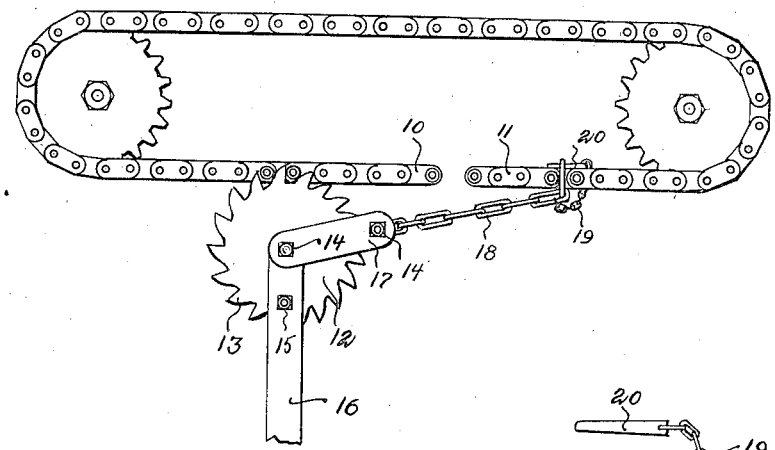
Figure 2 is a similar view showing the position of the parts after the tool has been inserted, parts of the chain being broken away to more clearly show the manner of connection between the chain and tool.
Figure 3:
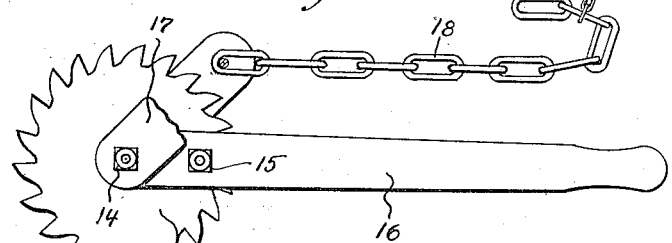
Figure 3 is a detail view of the tool per se.

In the use of the invention, the flexible element 18 is secured to one end of the chain, for example the end 11, by passing the extremity of the flexible element 18 in the chain 19 through the links and inserting the pin 20 within one of the links of the chain or flexible element 18. The teeth 13 of the head 12 are then engaged with the links of the end 10 of the chain, with the handle 16 in the position shown in Figure 1, that is, with the handle relatively close to the end 11 of the chain. By moving the handle 16 downward to the position shown in Figure 2, the chain end 10 will be caused to travel over the head 12 so that their ends will be brought into proper position to receive a coupling link.

The invention is susceptible of various changes in its form, proportions and minor details of construction and the right is herein reserved to make such changes as properly fall within the scope of the appended claim.

Having described the invention what is claimed is:—

A tool of the class described comprising a circular head, an operating handle carried by the head, teeth extending radially therefrom for engagement with the links at one end of a chain, a yoke pivotally secured to the head and a flexible element having one end connected to the yoke and the opposite end detachably engaged with the opposite end of the chain.

In testimony whereof I affix my signature.

DANIEL DOYLE.